United States Patent

Schneider

[15] 3,652,785

[45] Mar. 28, 1972

[54] ARRANGEMENT FOR SUPPRESSING FRINGE EFFECTS IN COLOR TELEVISION CAMERAS

[72] Inventor: Hans-Dieter Schneider, Gross-Gerau, Germany

[73] Assignee: Fernseh GmbH, Darmstadt, Germany

[22] Filed: May 14, 1970

[21] Appl. No.: 37,268

[30] Foreign Application Priority Data

May 16, 1969 Germany ....................P 19 24 911.1

[52] U.S. Cl. ....................................178/5.4 R, 178/DIG. 29

[51] Int. Cl. ....................................H04n 9/04

[58] Field of Search......................178/5.4 R, 5.4 ST, 5.4 TC, 178/DIG. 29

[56] References Cited

UNITED STATES PATENTS

| | | | |
|---|---|---|---|
| 3,283,067 | 11/1966 | Bazin et al. | 178/5.4 |
| 3,495,035 | 2/1970 | Ando | 178/7.2 |
| 3,546,373 | 12/1970 | Macouski | 178/5.4 |
| 2,930,929 | 3/1960 | Shelton | 178/7.2 |
| 3,465,094 | 9/1969 | Biernson et al. | 178/5.4 |

*Primary Examiner*—Richard Murray
*Assistant Examiner*—P. M. Pecori
*Attorney*—Michael S. Striker

[57] ABSTRACT

An arrangement in which fringe effects associated with moving objects in color television cameras, are suppressed. The camera tubes are provided with scanning beams of low velocity electrons, and their beam current intensities are adjusted so that the resulting intensities exceed that intensity of the beam current required for discharge of the target at a predetermined brightness level. The beam current intensities are adjusted so that the inertia characteristics of the tubes which determine the fringe effects, become equalized among the tubes. A linear matrix connected to the outputs of the camera tubes combine the output signals in the required manner. Limiting elements connected to the inputs of the matrix limit the signal levels from the tubes to substantially the maximum level of the camera tube with the smallest beam current.

10 Claims, 5 Drawing Figures

Inventor:
Hans-Dieter Schneider
by
Attorney

Inventor:
Hans-Dieter Schneider
by [signature]
Attorney

ARRANGEMENT FOR SUPPRESSING FRINGE EFFECTS IN COLOR TELEVISION CAMERAS

BACKGROUND OF THE INVENTION

The present invention resides in a circuit arrangement for use in color television cameras having tubes with slow scanning beams. In particular, the tubes are of the plumbicon type. It is the object of the present invention to improve the reproduction of pictures containing moving objects.

In television cameras with tubes having slow scanning beams, a disturbance in the form of a so-called fringe effect appears in the reproduction of moving objects. The disturbance results from the condition that colored fringes appear at the edges of the moving objects. In these fringes, the color does not coincide with that of the object or that of the background. This disturbing effect has no relationship to the persistence effects which may possibly prevail behind the moving objects. In camera tubes, the inertia has been reduced currently to such an extent that the persistence effect does not make any substantial contribution. Whereas the physical basis for the fringe effect is not immediately apparent, photocathodes are used in the art for the purpose of reducing this effect. These photocathodes are used with preliminary illumination from a constant light source. The disturbing effect, however, is not completely eliminated.

The camera functions as if elements with different time constants are present in the individual channels. For this reason, this disturbing effect is also referred to as the build-up effect. The build-up or fringe effect, however, is in actuality dependent upon the brightness of the picture to be transmitted, and this would not apply to a passive delay element.

In general, the build-up effect increases in the individual channels of the color camera, with decrease in the brightness of the picture. As a result, the disturbing effect is more pronounced in the blue channel, in which the conversion of the light energy into picture signals is particularly unfavorable. With a fast-moving white object, therefore, the blue component, and also partly the red component, is too small at the forward edge. As a result, this forward edge assumes a yellow color.

It has also been found, furthermore, that the build-up effect is dependent not only upon the light intensity, but in addition also upon the intensity of the scanning beam. The effect, moreover, decreases with reduction in the beam current. Attempts may be made to compensate the more intense build-up effect in the blue channel through the use of a weaker scanning beam. This results, however, in the condition that the beam intensity of the blue channel is no longer sufficient for complete discharge of the target, in the case of highlights or high-intensity areas or spots. The blue signal is, therefore, prematurely limited. For example, very brilliant white surfaces in the picture become tinged with green, whether or not these surfaces are moving.

The preceding problems and disturbing effects are eliminated, in accordance with the present invention, by adjusting the beam current intensities of the camera tubes, so that the intensities are above that necessary for target discharge at a predetermined level of brightness. The inertia characteristic determining the fringe effect is compensated among the different tubes. Limiting elements, furthermore, are inserted between the inputs of a matrix for the purpose of limiting the signal level of all channels, to an amount corresponding to the tube with the smallest beam current. In a WRB camera, for example, the green component is produced in the matrix by subtracting the components red and blue from the white component. The beam current for white is the adjusted to 400 percent of the beam intensity essential for maximum brightness. The beam current for red, on the other hand, is adjusted to 200 percent whereas this adjustment for blue is 120 percent. The limiting elements in the white and blue channel in front of the matrix are adjusted to 110 percent, and the limiters at the outputs of the matrix are adjusted to 105 percent. Through adaptation of such a circuit, in accordance with the present invention, the build-up effect can be substantially eliminated. It is also possible, through the present invention, to reduce substantially the light intensity of the pre-illumination which may give rise to undesirable signals.

SUMMARY OF THE INVENTION

An arrangement for the suppression of fringe effects visible in moving objects in color television cameras. The camera tubes have scanning beams of low velocity electrons. The beam current intensities of the camera tubes are adjusted so that the resulting intensities exceed the intensity of the beam current required for discharge of the target at a predetermined brightness level. The adjustment of the intensities of the beam currents is such that the inertia characteristics of the tubes which determine the fringe effects become equalized among the tubes. A linear matrix is connected to the outputs of the camera tubes and combine the signals from the tubes. Limiting elements in the form of diodes combined with variable voltage sources, are connected to the inputs of the matrix and serve to limit the levels of the output signals from the camera tubes. The limiting action is such that the signals are limited to substantially the maximum level of the camera tube with the smallest beam current. Preamplifiers connected to the outputs of the camera tubes are controlled through a switching arrangement which is linked to the arrangement for adjusting the beam intensities.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1A, 1B:
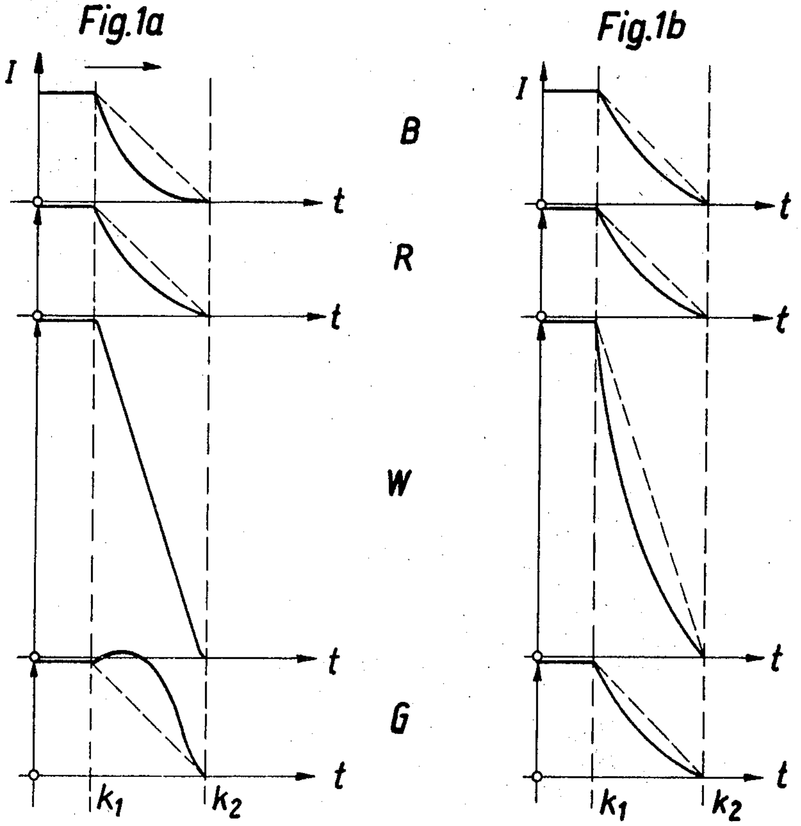
FIG. 1*a* and 1*b* are graphical plots of beam current intensities as a function of time, and show the build-up effect and its elimination, respectively.

Referring to the drawing, and in particular to FIG. 1*a*, there is shown a graph, as a function of time, of the signal intensity in a camera having a non-compensated fringe effect or build-up effect. In a practical embodiment using a WRB camera, the green component G is derived by subtracting the signals of the channels red and blue (R and B) from the signal of the white channel W. In the diagram of FIG. 1*a*, the curves R, B and W are shown in solid lines and correspond to the movement of an edge from the left to the right, in the direction of the arrow illustrated in the drawing. The relative intensities of the picture signals are plotted along the ordinate of the graph, whereas time is plotted along the abscissa.

Within the interval O and $K_1$, the full signal amplitude prevails, because the moving surface is homogeneous, and may be assumed large to the extent that the illumination intensity of the photocathodes of the camera tubes, is not varied by the movement of the surface within a time interval corresponding to a frame change. In the region between $K_1$ and $K_2$ of the graph, the signal intensity may be theoretically expected to drop linearly, as indicated by the dashed-line curves, when using a tube without the fringe effect. The drop results from the condition that the picture elements contained within the moving picture or video object, assume their charge over a finite time interval. Due to the inertia inherent in the tubes, however, the blue channel will deviate markedly from the linear curve. A somewhat smaller deviation takes place in the red channel, as can be seen in examining the graph between the interval limited by $K_1$ and $K_2$. No inertia characteristics are assumed relative to the white channel.

As already indicated, the inertia property depends upon the intensity of illumination and upon the photoelectric efficiency of the light within the channels. The amplitudes of R, B and W are arbitrarily assumed to have magnitudes in the ratios of 1:1:3. The amplitudes result from the amplification in the preamplifier, in case of differing sensitivities of the camera tubes. The amplitude relationship is being used here for illustrative purposes to demonstrate the fringe effect. The relationship may be considerably different in actual practice.

If, now, the green component G is derived through subtraction of the components R and B from W within a matrix, then the result will be a green signal having a considerably different character. This is due to the difference in the shapes of the curves of the three components. Thus, the amplitude of the green signal may even exceed that amplitude which applies in the interval zero to K1. Accordingly, when reproducing a picture composed of the components R, G and B, a green glow effect will appear at the edges of a white moving object. Similar considerations apply to objects of other colors.

It is the object of the present invention to equalize the shape of the transition curve of the signals of all channels at the edges of an object. A similar build-up behavior is to be indicated by the color signals produced, even when mixing the components in a matrix.

In referring to FIG. 1*b*, the build-up effect of B is reduced when compared with the function shown in FIG. 1*a*. In the case of the R signal, the build-up effect is not changed. With respect to the W signal, however, the build-up effect is increased through suitable adjustment of the intensity of the beam current. As a result, the signal in the green channel, as well as all of the mixed colors formed by the matrixing, assume a non-linear shape. The shape of the beginning of the curve due to the composite signal for the edges of the object produce the same color as the color of the actual surface of the moving object. The build-up effect becomes thereby imperceptible.

Figure 2:
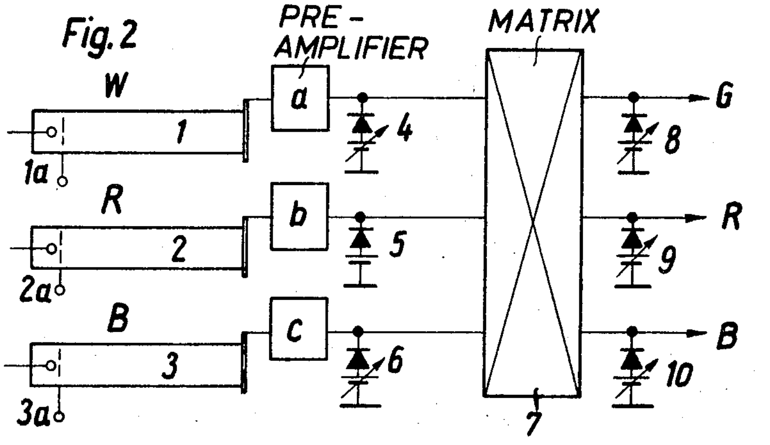
FIG. 2 is a functional circuit diagram of a color television camera in which the build-up effect is substantially eliminated.

The practical structure of the present invention, is disclosed in FIG. 2. Camera tubes 1, 2 and 3 correspond to the color channels W, R and B, respectively. The camera tubes may be of the plumbicon type, or of the vidicon or even the super orthicon type. Limiting elements 4, 5 and 6 are shown in the form of diodes, for example, and controllable voltage sources for bias purposes. The limiting elements cut off the picture signals above a predetermined level. A linear matrix 7 is used to derive the green component. Another set of limiting elements 8, 9 and 10 are provided at the outputs of the matrix. These elements are similar to the limiting elements 4, 5 and 6, and are provided with a controllable voltage source.

To suppress the fringe effect, the beam current intensities of the camera tubes 1, 2 and 3, are adjusted in a predetermined manner at the Wehnelt electrodes of the beam system 1*a*, 2*a* and 3*a*. This adjustment may also be accomplished through variable heating of the cathodes. The beam intensity of the blue channel which has normally a large build-up inertia, is initially adjusted to be as low as possible. Thus, this initial adjustment is, for example, 120 percent compared to the normal adjustment of about 200 percent corresponding to the current required for normal brightness. A 100 percent adjustment corresponds to a beam current intensity at which saturation would take place for a maximum signal amplitude to be transmitted. In this way, therefore, the build-up inertia in the blue channel is made as small as possible. The beam current intensity in the red channel is adjusted to approximately 200 percent, whereas it is adjusted to approximately 400 percent in the white channel. The build-up effect in the red channel is, consequently, not materially altered. The effect in the white channel, however, is substantially pronounced by the more intense scanning beam. Through fine adjustment of the beam currents, the fringe effect can be substantially eliminated.

With high-intensity areas as for example the sun reflections or the presence of lamps within the picture, however, no differences will appear in the control of the individual channels. This is due to the condition that the blue channel, for example, becomes already saturated due to the small beam current, before the white channel becomes saturated. With the limiting elements 4, 5 and 6 inserted in front of the matrix, the level of the matrix elements depart only slightly from the level of the channel having the smallest beam current. Thus, assume, for example, that the limiting elements are adjusted to 110 percent of the signal level of the tube 3. The limiting element 6 could be possibly omitted, and the bias voltage of the elements 4 and 6 may be derived from the same voltage source. At the outputs of the matrix, further limiting elements 8, 9 and 10 are provided, and these may be adjusted, for example, to 105 percent for purposes of achieving equality of signal level.

The present invention is not restricted to color television cameras with three tubes. The present invention can, instead, also be readily adapted to cameras with two tubes or with four tubes. At the same time, the present invention is also applicable to color television cameras in which the signals are not derived as in the preceding embodiment, from the spectral regions of white, red and blue. Instead, the signals may be derived from other spectral regions as, for example, red, green and blue.

Figure 3:
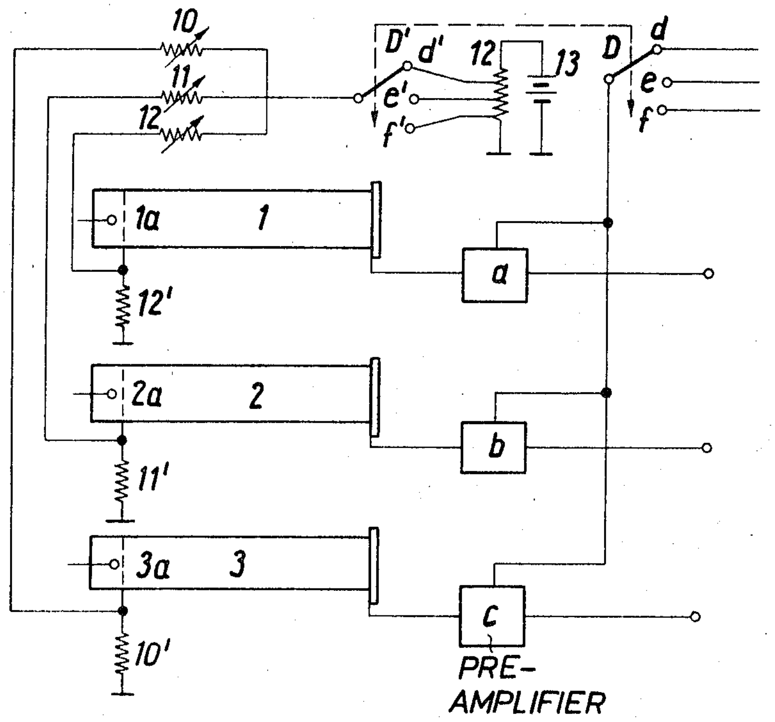
FIG. 3 is another embodiment of FIG. 1 with the inclusion of regulation of amplifiers used at the outputs of the camera tubes of the color television camera.

In accordance with another embodiment of the present invention, shown in FIG. 3, the regulation or adjustment of beam current can be mechanically coupled to the amplification adjusting means in the pre-amplifiers *a*, *b* and *c*. These preamplifiers are within the individual channels in order to produce always optimum beam current intensities aimed at eliminating the fringe effect and the discharge of the target.

In the circuit arrangement of FIG. 3, camera tubes 1, 2 and 3 correspond again to the channels W, R and B, respectively, which are provided with beam control electrodes 1*a*, 2*a* and 3*a*. Pre-amplifiers *a*, *b*, and *c* are connected to the signal electrodes of the camera tubes. These preamplifiers are each adjusted in accordance with the brightness of the scene so that white level attains a substantially constant value or magnitude. The amplifiers are connected, for this purpose, through control lines to a switch D. This switch possesses contacts *d*, *e* and *f* to which different DC voltages may be applied. Another switch D′ is connected to this switch D. The switch D′ has contacts *d′*, *e′*, *f′* also connected to a source of voltage 12, 13 through taps which provide negative bias voltage.

Through the voltage dividers 10, 10′, 11, 11′, and 12, 12′, the ratios of the beam currents are adjusted to magnitudes so that complete suppression of the fringe effect takes place at low illumination intensity. The two switches D and D′ are mechanically linked so that the conditions set forth in the following table are realized at various illumination intensities.

| | Amplification | Circuit D | Beam current: White, percent | Beam current: Blue, percent | Beam current: Red, percent | Switch D′ |
|---|---|---|---|---|---|---|
| Illumination intensity: | | | | | | |
| Small | Large | d | 400 | 120 | 200 | d′ |
| Normal | Normal | e | 200 | 200 | 200 | e′ |
| Large | Large | f | 200 | 200 | 200 | f′ |

The percentages listed in the table for the adjusted beam currents correspond to those currents which are just necessary for scanning the color components of a white original, at a particular illumination intensity. Since the fringe effect is disturbing at only small illumination intensities, the beam currents are adjusted only at such low illumination intensities. The adjustment is in the direction of retarding the fringe effect. In the case of normal and large illumination intensities, the beams or beam currents are adjusted, in the conventional manner, so that incompletely scanned high-intensity areas are reproduced as white, insofar as this is possible. Accordingly, when adjusting the beam current intensities in accordance with the present invention, any noticeable fringe effects are substantially suppressed. By using the circuit of the present invention therefore, it is possible to operate the camera without disturbing effects, even when working under highly unfavorable illumination conditions. In the past, such unfavorable illumination conditions gave rise to considerable color imperfections with respect to moving objects, and these imperfections had a disturbing effect to the viewer.

For as long as the amount of light corresponding to the adjusted beam current does not fall upon the light-sensitive layer of the camera tube, an increase in the beam current has only the effect of reducing the fringe effect. For those parts of the picture in which the brightness exceeds far the normal level, undesirable effects will result from the strong or sharp increase in the beam current. The center of such a bright area will, thereby, for example, appear darker than the edges thereof. With many camera tubes, furthermore, the level of the permissible signal current is exceeded in this type of operation. The present invention therefore provides for the reduction of the beam current as soon as the predetermined signal level is exceeded by the signal which is generated and amplified by the particular camera tube.

Figure 4:
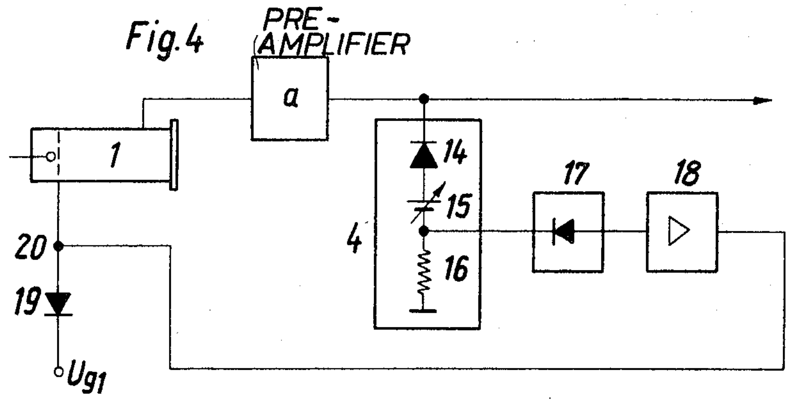
FIG. 4 is a functional circuit arrangement of a control device used in conjunction with the embodiments of FIGS. 2 and 3, in accordance with the present invention.

FIG. 4 illustrates a structural embodiment for accomplishing the preceding objective. The circuit arrangement of FIG. 4 provides for reducing the beam current relative to only one camera tube. The circuit, however, is provided for all of the camera tubes in a color television camera.

The camera tube 1 in FIG. 4 is similar to that shown in FIGS. 2 and 3, and the output of this camera tube 1 is transmitted to a limiting circuit 4, by way of a pre-amplifier a. The limiting circuit 4 includes a diode 14, a voltage source 15, and a resistor 16. The voltage drop across the resistor 16 corresponds to the signal components which exceed the adjusted signal level. If the magnitude of the resistor 16 is made substantially small, then the limiting effect of the circuit device 4 is reduced only in a substantially negligible manner.

The signal components appearing across the resistor 16, are transmitted to an amplifier 18. The amplified signal components are then applied to the Wehnelt cylinder of the camera tube. The voltage Ug1 corresponding to the magnitude of the beam current for normal operation, is applied to the Wehnelt cylinder, by way of diode 19. When the amplified output signals for the television camera tube 1 exceed the predetermined signal level, a negative voltage appears at the circuit junction 20. This negative voltage increases with the amount by which the television signals exceed the predetermined signal level. As a result, the beam current of the camera tube 1 is reduced.

If the amplification factor of the amplifier 18 is made substantially high, a beam current will be established with a signal amplitude only slightly above the predetermined level. This is independent substantially of the level of the excess.

The diode 19 has been introduced in FIG. 4 for the purpose of providing for separation of the constant voltage Ug1 and the amplified signal components. Since, however, it is only required that the amplified signal components and a constant voltage Ug1 be superimposed, it is also possible to introduce a resistor in this part of the circuit.

It will be understood that each of the elements described above, or two or more together, may also find a useful application in other types of constructions differing from the types described above.

While the invention has been illustrated and described as embodied in an arrangement for suppressing fringe effects in color television cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims:

1. An arrangement for suppressing fringe effects in a color television camera comprising, in combination, a plurality of camera tubes with scanning beams of low velocity electrons; adjusting means for adjusting the beam current intensities of said camera tubes so that said adjusted intensities exceed the intensity of the beam current required for discharge of the target at a predetermined brightness level and for adjusting said intensities so that the inertia characteristics of the tubes determining said fringe effects are equalized among said tubes; linear matrix means connected to the outputs of said camera tubes for combining the output signals from said tubes; and limiting means connected to the inputs of said matrix means for limiting the levels of said output signals from said tubes to substantially the maximum level of the camera tube with the smallest beam current, whereby colored fringes appearing along border lines between moving objects and background of a color television picture are substantially eliminated, said fringes being of a color different from the colors of the object and said background on the respective sides of said border lines.

2. The arrangement as defined in claim 1, wherein said color television camera has a white, red and a blue channel, the current intensity of the camera tubes of said blue, red and white channels being adjusted respectively to substantially 120 percent, 200 percent and 400 percent of the current intensity required for a predetermined brightness level.

3. The arrangement as defined in claim 2, wherein said limiting elements are adjusted to substantially 110 percent of the current intensity required for said predetermined level.

4. The arrangement as defined in claim 1 including auxiliary limiting elements connected to the outputs of said matrix means and being adjusted to a level substantially lower than the level of said limiting means connected to the inputs of said matrix means.

5. The arrangement as defined in claim 4, wherein said auxiliary limiting means are adjusted to substantially 105 percent of the current intensity required for a predetermined brightness level.

6. The arrangement as defined in claim 1 including amplifying means at the outputs of said camera tubes for amplifying said output signals from said tubes; switching means connected to said amplifying means for controlling said amplifying means, said switching means being linked to said adjusting means so that the beam current intensities are decreased with increase in amplification by said amplifying means while the adjusted relationship among said camera tubes set by said adjusting means remains constant.

7. The arrangement as defined in claim 1 including control means connected to the output of said camera tubes for limiting said beam currents when a predetermined signal level is exceeded.

8. The arrangement as defined in claim 5 including amplifying means connected to the outputs of said camera tubes for amplifying components exceeding a predetermined signal level and transmitting the amplified components to a Wehnelt cylinder.

9. The arrangement as defined in claim 6, wherein said adjusting means comprises further switching means mechanically coupled to said switching means controlling said amplifying means.

10. The arrangement as defined in claim 1, wherein said limiting means comprises diode means; and variable voltage source means connected to said diode means.

* * * * *